Dec. 1, 1970    F. FRÜNGEL    3,544,797
LIGHT RECEIVER HOUSING HAVING INCLINED MIRROR
MOUNTED ON TILTABLE SHAFT
Filed June 17, 1968
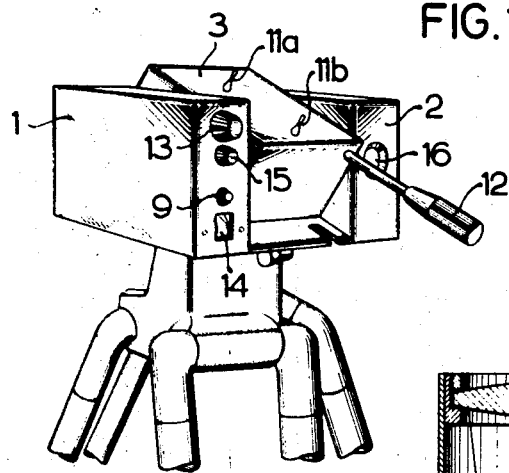
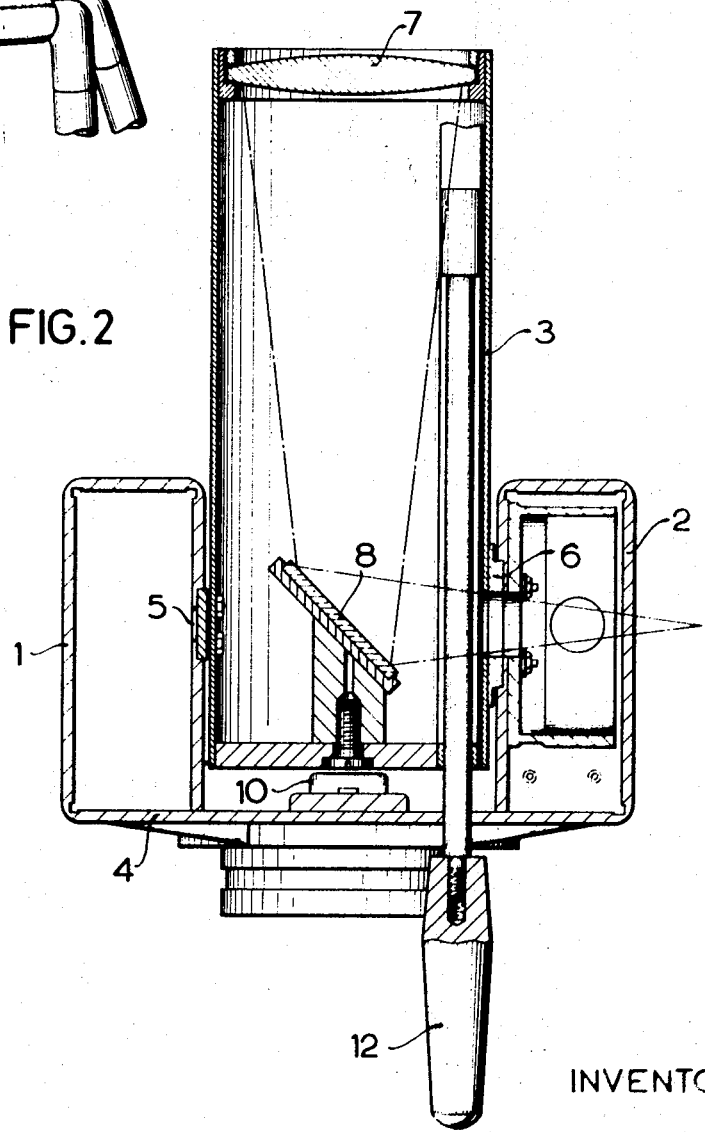
INVENTOR
FRANK FRÜNGEL
By Michael S. Striker
Attorney

United States Patent Office 3,544,797
Patented Dec. 1, 1970

---

3,544,797
LIGHT RECEIVER HOUSING HAVING INCLINED MIRROR MOUNTED ON TILTABLE SHAFT
Frank Früngel, Hamburg-Rissen, Germany, assignor to Impulsphysik G.m.b.H., Hamburg-Rissen, Germany
Filed June 17, 1968, Ser. No. 737,772
Claims priority, application Germany, June 15, 1967, 1,572,685
Int. Cl. G06m 7/00
U.S. Cl. 250—216                                    9 Claims

ABSTRACT OF THE DISCLOSURE

A light signal receiver, especially a receiver for a cloud altitude meter operated by light impulses reflected from a cloud, with a tiltable optical means for receiving reflected light impulses and for directing the same onto a photocell connected to an amplifier, in which the photocell is not mounted in the optical means for tilting movement therewith, but in a stationary housing member housing also the amplifier, while the optical means is mounted on a hollow shaft for tilting relative to the housing member and includes a mirror inclined to the shaft axis for directing light impulses received by the optical means through the hollow shaft onto the photocell in the stationary housing member so that a flexible conductor between the photocell and the amplifier may be omitted.

BACKGROUND OF THE INVENTION

The present invention relates to a light signal receiver, especially a receiver for a cloud altitude meter operated by light impulses reflected from a cloud and including a tiltable optical means for receiving the reflected light impulse and for directing the received light impulse onto a photocell connected to an amplifier.

In such light signal receivers it is common practice to mount the photocell in the tiltable optical means and to transmit the electrical signal produced by the photocell to the amplifier through a conductor. Such an arrangement has the disadvantage that it requires a flexible conductor between photocell and amplifier which will be twisted and thereby easily damaged during extended use of the light signal receiver and repeated tilting of the optical means about its axis and which also has the disadvantage that the conductor necessarily becomes relatively long so that part of the electrical energy produced by the photocell is used up by the resistance of this long conductor.

It is an object of the present invention to provide for a light signal receiver of the aforementioned kind in which the above-mentioned disadvantages are avoided.

It is a further object of the present invention to provide for a signal receiver of the aforementioned kind in which a flexible conductor between photocell and amplifier which is twisted during tilting of the optical means is avoided.

SUMMARY OF THE INVENTION

With these objects in view, the light signal receiver according to the present invention, especially a receiver of a cloud altitude meter operated by reflected light impulses, mainly comprises support means including at least one stationary housing member housing in the interior thereof a photocell, and optical means for receiving reflected light impulses and for directing the light impulses onto the photocell, in which the optical means is carried by the support means turnably about a hollow shaft and including a mirror located in the region of the shaft and inclined to the shaft axis in such a manner to reflect the light impulses received by the optical means through the hollow shaft into the stationary housing member so that the light impulses will be received by the photocell located in the stationary housing member.

This arrangement according to the present invention has the additional advantage that, due to the deflection of the light signal through the hollow shaft into the stationary housing member, the length of the optical means may be considerably reduced as compared with arrangements according to the prior art, for the same focal lengths of the optical means in the prior art arrangement and in the arrangement according to the present invention. This advantage is especially important when the light signal receiver is constructed as a small portable receiver.

In a preferred form of the light receiver according to the present invention there are provided two spaced, box-shaped housing members and the optical means is also box-shaped, of substantially the same cross-sectional form as the two stationary housing members and arranged between the latter tiltably on bearings provided in facing side walls of the housing members. In this arrangement the photocell and the amplifier connected thereto is preferably mounted in one of the housing members, whereas the other housing member houses a source of electrical energy.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWING

FIG. 1 is a perspective view of a light signal receiver according to the present invention mounted on a tripod; and FIG. 2 is a vertical cross section through the light signal receiver as shown in FIG. 1 and drawn to an enlarged scale.

DESCRIPTION OF THE PREFERRED EMBODIMENT

It is known to determine the altitude of a cloud by a trigonometric method. In such a method, light impulses are directed vertically upwards from a light impulse transmitter to a cloud. A light impulse receiver is mounted at a predetermined fixed distance from the light impulse transmitter and the light impulse receiver has optical means tiltable from a horizontal position facing the transmitter to a vertical position. When the optical means are tilted under such an angle that the light impulses reflected by the cloud are received by the optical means of the light signal receiver, the altitude of the cloud can be calculated from the product of the distance between the transmitter and the receiver and the tangent of the angle the axis of the optical means includes with the horizontal. The light signal receiver according to the present is especially adapted for the aforementioned purpose, but it is to be understood that the basic principle of the light signal receiver according to the present invention may be used also in other applications.

Referring now to the drawing, it will be seen that the light signal receiver according to the present invention comprises support means including a pair of stationary, box-shaped housing members 1 and 2 arranged spaced from each other on a common base plate 4 which may be mounted in any suitable member on a tripod as shown in FIG. 1. Optical means 3 of box-shaped form, of substantially the same cross section as the stationary housing members 1 and 2, are arranged between the facing side walls of the latter and mounted for tilting movement about a substantially horizontal axis on bearing means 5 and 6 carried by the facing side walls of the stationary housing members 1 and 2. An end wall of the optical means 3 carries an objective lens 7.

A mirror 8 is arranged in the interior of the housing 3 in the region of the axis of the bearing means 5, 6 and inclined at an angle to this axis in such a manner that the light rays concentrated by the objective lens 7 and impinging on the mirror 8 are deflected through an angle of 90° onto a non-illustrated photocell located in the housing 2. In order to permit passage of the light rays into the housing member 2, the bearing means 6 includes a hollow shaft so that the light rays reflected by the mirror 8 may pass through the hollow shaft into the housing member 2 in which it may be reflected a second time through an angle of 90° onto a photocell. By deflecting the light rays in such a manner once or twice, it is possible to reduce the overall length of the apparatus considerably.

To properly adjust the position of the light signal receiver, a water level 10 is mounted on the base plate 4 beneath the tiltable housing 3. In order to facilitate alignment of the light signal receiver with a transmitter mounted at a distance from the receiver, visor means 11a and 11b, as shown in FIG. 1, are mounted on the top plate of the housing 3. In order to tilt the optical means, i.e., the housing 3, about the tilting axis determined by the bearing means 5, 6, a handle 12 is provided having an inner rod-shaped part telescopically received in a tube fixedly mounted in the member 3 so as to be movable between a retracted position, as shown in FIG. 2, and an extended position in which the handle 12 projects further from the housing 3 than in the retracted position. As shown in FIG. 1, the front wall of the housing member 1 carries various elements for operating the light signal receiver. These elements may include a signal lamp 9 for a sensitivity control 13 for the amplifier for the photocell, a volt meter 14 for the source of electrical energy, which is preferably in form of an accumulator and mounted in the housing member 1, and a main switch 15. The housing member 1 preferably carries also means for charging the accumulator. The amplifier means for the photocell are preferably mounted together with the photocell in the housing member 2.

It will be understood that each of the elements described above, or two or more together, may also find a useful application in other types of light signal receivers differing from the types described above.

While the invention has been illustrated and described as embodied in a light signal receiver in which light signals received in tiltable optical means are deflected by a mirror through a hollow shaft, about which the optical means is tiltable, onto a photocell arranged in a stationary housing adjacent the tiltable optical means, it is not intended to be limtied to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristic of the generic or specific aspects of this invention and, therefore, such adaptations should and are intended to be comprehended within the meaning and range of equivalence of the following claims.

What is claimed as new and desired to be protected by Letters Patent is set forth in the appended claims.

I claim:
1. A light signal receiver, especially a receiver of a cloud altitude meter operated by reflected light impulses, comprising, in combination, support means including at least one stationary housing member and adapted to house in the interior thereof a photocell; and optical means for receiving reflected light impulses and for directing the light impulses onto the photocell, said optical means being carried by said support means turnably about the axis of a hollow shaft and including a mirror located in the region of the shaft axis and inclined to the latter in such a manner to reflect the light impulses received by said optical means through said hollow shaft into said stationary housing member so that said light impulses will be received by a photocell located in the stationary housing member.

2. A light signal receiver as defined in claim 1, and including a second stationary housing member spaced from said one housing member and each having a side wall facing the side wall of the other member, said optical means being located between said facing side walls of the housing members and bearing means in said side walls supporting said optical means turnable about said axis, said hollow shaft extending through one of said bearing means.

3. A light signal receiver as defined in claim 2, wherein said housing members and said optical means are box-shaped and having each substantially the same length and height.

4. A light signal receiver as defined in claim 2, wherein said housing members are connected to each other by a common base plate.

5. A light signal receiver as defined in claim 2, and including amplifier means for said photocell in said one housing member and a source of electrical energy in the second housing member.

6. A light signal receiver as defined in claim 5, wherein said source of electrical energy comprises an accumulator and means for charging the accumulator.

7. A light signal receiver as defined in claim 1, wherein said optical means includes a box-shaped housing and a handle projecting from said housing for turning said optical means about the axis of said hollow shaft.

8. A light signal receiver as defined in claim 7, wherein said handle extends substantially normal to the axis of said hollow shaft and is in part telescopically received in said housing to be movable between a retracted and an extended position in which said handle projects further from said housing than in said retracted position.

9. A light signal receiver as defined in claim 1, wherein said optical means includes a box-shaped housing having a top wall, and including visor means carried by and projecting upwardly from said top wall.

References Cited
UNITED STATES PATENTS
3,214,596 10/1965 Schwerot _____ 250—239
3,360,656 12/1967 Kinnard _____ 250—239

WILLIAM F. LINDQUIST, Primary Examiner

MARTIN ABRAMSON, Assistant Examiner

U.S. Cl. X.R.
250—234, 239